United States Patent
Schipper et al.

(10) Patent No.: US 6,313,377 B1
(45) Date of Patent: Nov. 6, 2001

(54) PROCESS FOR PROLONGING THE SHELF LIFE OF PRIMED NONGERMINATED SEEDS

(75) Inventors: Job Schipper, Grootebroek; Peter Van Der Toorn; Tonko Bruggink, both of Enkhuizen, all of (NL)

(73) Assignee: Syngenta Participations AG, Basel (CH)

( * ) Notice: Subject to any disclaimer, the term of this patent is extended or adjusted under 35 U.S.C. 154(b) by 1217 days.

(21) Appl. No.: 08/667,167

(22) Filed: Jun. 20, 1996

Related U.S. Application Data

(63) Continuation of application No. 08/395,348, filed on Feb. 28, 1995, now abandoned.

(30) Foreign Application Priority Data

Mar. 1, 1994 (GB) .................................................. 9403941

(51) Int. Cl.$^7$ ..................................................... A01H 5/00
(52) U.S. Cl. .......................................... 800/298; 47/58.1
(58) Field of Search ....................... 47/58, 58.1; 34/486, 34/492, 495, 496, 499, 497, 503, 504, 115, 595; 800/298

(56) References Cited

U.S. PATENT DOCUMENTS

| | | | |
|---|---|---|---|
| 3,521,402 | * | 7/1970 | Chaffee ..................................... 47/58 |
| 4,905,411 | * | 3/1990 | Finch-Savage .......................... 47/58 |
| 4,912,874 | * | 4/1990 | Taylor ...................................... 47/58 |
| 5,119,589 | * | 6/1992 | Rowse ...................................... 47/58 |
| 5,522,907 | * | 6/1996 | Brugginks et al. ....................... 47/58 |

OTHER PUBLICATIONS

Taylor, A.G., et al., (1988) "S.M.P.: Solid Matrix Priming of Seeds" *Scientia Horticulturae*, 37 pp. 1–11.*
Hadar Y., et al., (1983) "Effects of Pregermination of Pea and Cucumber Seeds and Seed Treatment with *Enterobacter cloacae* on Rots caused by Phytheum app" Phytopathology vol. 73 No. 9 pp. 1322–1325.*
Hegarty, T.W. (1977) "Seed activation and seed germination under moisture stress" New Phytol. vol. 78, pp. 349–359.*
Hedeckers, W., et al. "(1977)" Seed treatments or improved Performance–Survey and attempted Prognosis, Seed Science and Technology pp. 353–425.*
Bradford, K.J., (1986) "Minipulation of Seed Water Relations via osmotic Priming to Improve Germination Under Stress Conditions" *HortScience* 21(5) pp. 1105–1112.*
Peterson, J.R., (1976) "Osmotic Priming of Onion Seeds—The Possiblity of a Commercial Scale Treatment" *Scientia Horticultural* 5 pp. 207–214.*
Bennett, M.A., et al. (1987) "Seed Hydration Treatments for Improved Sweet Corn Germination and Stand Establishment" *J. Amer Soc Hor Sci.* 112(10 pp. 45–49.*
Baker, R. (1987) "Improved *Trichoderma* species for promoting crop Productivity" TIBTECH vol. 7, pp. 34–38.*
Kloepper, J.W., et al. (1989) "Tree–living bacterial inocula for enhancing crop productivity"TIBTECH vol. 7, pp. 39–44.*
Chav, W.L., et al. (1986) "Colonization of the Rlngospherety Biological Control Agents Applied to Seeds" *Phytopathology* pp. 60–65.*
Copeland, L.O. "Chapter 11 Seed Drying" Principles of Seed Science and Technology, Burgess Pub. Co. Minn. Minnesota, 1976 pp. 257–264.*
Hartmann, H.T., et al., "Techniques of Seed Production and Handling" *Plant Propagation* ($2^{nd}$Ed). 1968, Prentice–Hall, Inc., pp. 100–101 abd 106–116.*
Bewley, J.D., et al., "Viability and Longevity" *Physiology and Bio–Chemistry of Seeds,* 1982, Springer–Verlag, New York, pp. 7–9 and 43–59.*

* cited by examiner

Primary Examiner—Bruce R. Campell
Assistant Examiner—A Para
(74) Attorney, Agent, or Firm—Lynn Marcus Wyner; Bruce Vrana

(57) ABSTRACT

A method of treating primed seeds which results in a prolongation of shelf life compared to optionally dried conventionally primed seeds of the same species having substantially the same moisture content (MC), wherein the primed seeds are subjected to a water stress, a heat treatment or a combination thereof and are subsequently—where desired—dried back to a desired MC and seeds obtainable by such a method.

21 Claims, No Drawings

PROCESS FOR PROLONGING THE SHELF LIFE OF PRIMED NONGERMINATED SEEDS

This is a continuation application of Ser. No. 08/395,348, Feb. 28, 1995, now abandoned.

The present invention relates to treated primed seeds having a longer shelf life than conventionally primed seeds, a process for obtaining such seeds and plants derived therefrom.

Primed seeds and methods for obtaining them are known in the art.

Primed seeds are generally capable of a faster germination over time and display better synchronization in germination, than non-primed seeds.

Conventional seed priming processes are i.a. disclosed by EP 309 511 B1 and EP 254 569 B1.

The present invention provides a method of treating primed seeds which results in a prolongation of shelf life compared to optionally dried back conventionally primed seeds of the same species having substantially the same moisture content (MC) chatacterised in that the primed seeds are subjected to a water stress, a heat treatment or a combination thereof and are subsequently—where—desired—dried back to a desired MC.

The drying back of the seeds as abovementioned, involves a reduction in the seed MC. The drying back may be to any desired MC. In a preferred embodiment the drying back is to a MC of untreated seeds, i.e. dry seeds which have not been primed.

Hereinafter the terms MC and water content will be used interchangeably. The MC will be given in percentage terms, based on seed fresh weight(unless otherwise stated).

The water stress may be achieved by any manner known in the art which will result in the seeds having a lower MC.

In general a water stress will be obtained by reduction of the MC of conventionally primed seeds by 5% units or more, i.e. to 20% or less, if the conventionally primed seeds have an initial MC of 25%, or to 50% or less if the conventionally primed seeds have an initial MC of 55%. More specifically, the water stress will in general be achieved by reduction of the MC by 5% units up to 20% units, whereby, it is in general advantageous not to reduce the MC to a value below 15%.

The water stress should be maintained for a longer period of time, in general 1 to 7 days, depending i.a. on the temperature, whereby the optimum conditions will depend on the seed species and can be determined by standard tests. It will be appreciated that this can be achieved by maintenance of the MC of the conventionally primed seeds constant at the desired reduced level (i.e. conveniently 5 to 20% units below the MC of conventionally primed seeds) or by drying the conventionally primed seeds slowly enough for them to remain sufficiently long under water stress.

Accordingly prolonged shelflife may be attained by incubation of the primed seeds at a water potential which induces a water stress, by slow MC reduction of primed seeds, by an initial quick MC reduction of primed seeds up to a MC where the seeds are still subject to water stress, followed by incubation or slow MC reduction of the thus obtained partly dried primed seeds or by a heat shock. Slow MC reduction can be achieved in a manner known per se, e.g. by drying under mild conditions or by bringing the primed seeds in contact with an osmoticum that is not toxic to the seeds and having a water potential below 0 MPa. The description of processes (a), (b) and (c) hereinafter, illustrates typical conditions for subjecting primed seeds to a water stress.

The water stress may be achieved by:
a) slowly drying prim ed seeds at a temperature of from 3 to 40° C. for 3 to 7 days, or
b) reducing the MC of primed seeds under conventional drying conditions by 5 to 20% units and storing the thus dried seeds for 1 to 7 days in a container with minimal air and moisture exchange, at a temperature of from 3 to 40° C. or
c) incubating primed seeds in an osmoticum for 1 to 7 days at a water potential chosen to reduce the MC of the primed seeds by 5 to 20% units.

The heat treatment may be achieved by subjecting primed seeds to a heat shock in the range of from 25 to 45° C. for from about 1 to 5 hours.

The seeds produced according to the processes of the invention, have greater desiccation tolerant embryos than conventionally primed seeds, in that the former survive longer storage periods under ambient storage conditions as hereinafter defined.

By a seed comprising a desiccation tolerant embryo is meant a seed in which a reduction in the MC of the seed to a value typical for dehydrated seeds e.g. of about 5 to 7%, does not substantially adversely affect the seeds viability, the viability being measured in terms of its ability to germinate when placed under suitable growing conditions or after an appropriate standard test, e.g. a controlled deterioration test (see hereinafter) either before or after a prolonged storage period at ambient storage conditions.

The embryo of the seed is taken to means structures which are necessary for the development of the seed, such as the cotyledon, acis and non-emerged radicle tip and which collectively, or in part are able to acquire a desiccation tolerance.

Primed seeds can be stored for a number of weeks at about 5° C. but are unsuitable for storing for extended periods of time under ambient storage conditions.

By the term primed seed is meant (insofar as not otherwise stated), that the seed has been subjected to conventional priming techniques as hereinafter discussed, it has a MC in the range of from 20 to 55% (depending on species) and has a desiccation tolerance typical of conventionally primed seed. It will be appreciated that all non-primed seed is desiccation tolerant i.e can survive drying, the extent of desiccation tolerance being species dependent. On priming according to conventional processes, the seed becomes less desiccation tolerant, the loss in desiccation tolerance increasing with the increase in period of priming, until a point at which the seed can no longer be said to be desiccation tolerant, this complete loss of desiccation tolerance occurring at the point of germination of the seed. The processes of the present invention, as hereinafter described, are applied to non-germinated seed which has been primed according to conventional priming processes. Non-germinated seed is defined herein as seed in which the radical and/or hypocotyl has not protruded or emerged from the seed coat or pericarp. The radical and/or hypocotyl may have caused the seed coat to split or crack, however it will not have protruded through the split or crack. The endosperm surrounding the embryo. may be visible through the split or crack. Non-germinated conventionally primed seed to which the proceeses of the present invention have been applied, will hereinafter be referred to as as treated seed(s). Non-germinated conventionally primed seed(s) to which the processes of the present invention have not been applied, will hereinafter be referred to as conventionally primed seed(s). Commercially acceptable seed(s) which have not been primed, shall be referred to as untreated seed(s).

It is also possible to determine the stage of the germination process by physical parameters, e.g. size, volume or denity In this way, a selection can be made of seeds to be treated according to the invention.

Thus as is demonstrated below, treated seed has a longer shelf life than conventionally primed seed of the same species and MC. The longer shelf life can be demonstrated by measuring % germination under the same or similar conditions e.g standard growing conditions (as below defined), after either a controlled deterioration test, or storage under ambient conditions, the treated seed having higher % germination of normal plants compared to conventionally primed seed which have been subjected to the same controlled deterioration test or storage conditions.

By standard growing conditions is meant a temperature in the range of about 15 to 20° C. in the presence of air and water.

The term shelf life as used herein may be expressed in terms of viability (i.e. in terms of ability to germinate and give rise to normal plants after storage under ambient storage conditions, for example after subjection to a controlled deterioration (CD) test (Tarquis A. M. & Bradford K. J., J. Exptal. Bot. Vol. 43, 1982, No. 248,pp. 307–317). The viability of seeds subjected to the CD-test may be determined in laboratory tests according to International Rules (ISTA, 1976). Differences between CD test results generally correlate with differences in shelf storage life after storage under ambient storage conditions.

Typical examples of conventional priming methods include treatment of seeds with an osmoticum (as disclosed i.a. by Heydecker, and modifications thereof, such as for example the Drum Priming Method), treatment with water in a solid matrix (as disclosed i.a. in EP 309 551 B1) etc.

By the term "ambient storage conditions" is meant storage at ambient temperature and relative humidity (RH).

The term "ambient temperature" as used herein, refers to a temperature from about 3° C. to about 25° C. By the term "ambient RH" is meant a RH in the range of from about 20% to about 90° C.

Application of the processes (a), (b) or (c) of the invention as hereinbelow described, involves a reduction in seed MC.

Process (a) of the invention involves a slow rate of water loss of primed seeds(hereinafter referred to as slow drying). Thus, the primed seeds are subjected to an incubation phase in which the rate of water loss is maintained within the range of from about 0.1% and 1.0% of dry weight of the seed hour$^{-1}$, preferably within about 0.2% to about 0.4% h$^{-1}$. Slow drying can be performed in a drum (drum priming), oxygenated gas or oxygen being actively supplied or air may enter the system (passive conditions) simply, by mixing. The rate of water loss is determined by weighing seeds after different periods of incubation and plotting seed weight over time. It will be appreciated that the rate of moisture loss required to induce long shelf life will vary, from species to species, within the above defined range. Seeds held under such conditions will have a final MC of between about 5% to about 20%, generally from about 5% to about 15%, lower than that of the primed seeds.

In slow drying, the seeds can be incubated at any temperature between 3° C. up to about 40° C. Preferably, seeds are incubated at temperatures from about 20° C. to about 35° C. The incubation period lasts for about 24 hours up to about a week or more depending on incubation temperature. Thus e.g. the incubation period may be from about 24 hours up to about 3 days or more, at a temperature of 20° C., depending on seed type, or it may be for up to a week or more at a lower temperature, such as 8° C., depending on seed type. Lower temperatures can be employed, for example, to minimise the risk of infestation with pathogens.

According to process (b), hereinafter referred to as moist storage, primed seeds are incubated at a seed MC which is lower than the seed MC of primed seeds. Thus the MC of primed seeds is reduced (by drying under conventional drying conditions e.g. "fast drying conditions"), by between 3 to 20% units, preferably between 5% and 15% units, over a period of less than 24 h, such as 8h or less. The minimum value MC to which the seeds are dried is about 15%. Thereafter the so dried seeds are subjected to a water stress by incubation in a container with minimal air and moisture exchange, the temperature and length of incubation being as for slow drying above.

The term conventional drying conditions as used in connection with process (b) hereinabove(and where used hereinbelow) refers to conventional drying conditions e.g. drying back by means of a high speed air flow at ambient temperature as known in the art and generally applied for the drying of conventionally primed seeds.

A further method of subjecting primed seeds to a water stress, the incubation process according to process (c) of the present invention, comprises a PEG (or other suitable osmoticum solution) treatment, which involves a reduction in the seed MC of seeds which have been subjected to a priming step by incubation in solutions, the water potential of which is less than O MPa. During incubation seed water content is slowly reduced by between 3 to 20% units, as described for process (b), by keeping the osmotic potential of the solution at a specified value, within the range of from about −0.5 to about −4.0 MPa. In this state the seeds experience a mild water stress due to a lack of availability of free water. Incubation preferably takes place in a water column (liquid incubation), preferably under aerated conditions. It can also take place by placing the primed seeds on filter paper saturated in an osmoticum solution.

Suitable incubation conditions (length, temperature) for process (b) and (c) include i.a. the conditions as described for process (a).

The incubation according to process (c) will typically be carried out in an osmoticum having a water potential that is low enough to withdraw water from the primed seeds. Any suitable osmoticum which does not harm the seeds, can be used e.g. polyethylene glycol (PEG) solutions such as PEG 8000 (British Petroleum). Typically, the seeds are contacted with a solution such as PEG 8000, mannitol, or a salt solution such as NaCl or the like. The osmotic potential should be such, that the seed MC is held at a sufficiently low level so that the induction of desiccation tolerance occurs.

Plant growth regulators may be added to the osmoticum solution at a concentration of between about $10^{-2}$ M and $10^{-k}$ M in the first incubation. Suitable regulators include giberellins, abscisic acid (ABA), and auxins such as indole butyric acid (IBA).

In incubation in a water column, the amount of seed per unit volume solution, can be from 1–200 g seeds 1$^{-1}$. Preferably, the seeds are present at about 25 g seeds 1$^{-1}$. Generally, the incubation may be for several days, extending to weeks or longer. After incubation, the seeds are washed in water.

With incubation on filter paper, the paper is moistened with a suitable osmoticum(as above described). Generally, seeds imbibed and primed to a MC of between about 25% and 55%, can be laid onto the moistened filter paper in a closed system, having a high RH eg 100%, the temperature and contact time being as above described).

Where desired the MC of primed seeds can be reduced by e.g. about 10% units by fast drying, before incubation in an osmoticum as above described. Such a step is not however essential.

In the heat treatment, the primed seeds are subjected to a heat shock in the range of about 25 to 45° C., preferably in the range of 35 to 40° C., for periods of time in the range of from about 1 to about 5 h. Preferably the MC of seed which is subjected to a heat shock is in the range of from 0 to 20% units lower than the seed MC after priming. Generally it is advantageous that the MC of the seeds which are subjected to a heat shock, is not lower than 15%. The heat shock may be applied by any known suitable method. Thus suitably the seeds may be placed in a container which is then placed in an incubator.

It will be appreciated that the desired result (primed seeds having a long shelf life), may also be attained by a combination of water-stress and heat-stress i.e. a combination of heat shock with either process (a), (b) or (c).

The optimum process and optimum conditions for the above mentioned process (a) to (c) and the heat shock for a given seed species, may be established by determining the shelf life potential and germination rate (tsa) in a manner known per se.

Treatment of primed seeds according to any of the processes (a) to (c), the heat shock or a combination of such processes as above described, and subsequently—where desired—drying the seeds back to a desired MC, gives rise to seeds having a longer shelf life than conventionally primed seeds of the same species having substantially the same MC.

The invention therefore provides seeds obtainable by process (a), (b), (c), the heat shock or a combination of such processes as above described, the seeds subsequently— where desired—being drying back to a desired MC.

The present invention also provides treated primed seeds in wet or dry form, having a shelf life when stored under ambient storage conditions, which is substantially longer than that of conventionally primed seeds of the same species having substantially the same MC and of which the MC has optionally been reduced under conventional drying conditions.

The seeds of the invention have a MC within the range of that typical for dry i.e untreated seeds, up to a MC at which metabolic processes other than germinative metabolic processes continue.

Typical commercial forms of the seeds of the invention include seeds having a MC in the range of from more than 15% to about 55% , (hereinafter referred to as wet seeds of the invention) and seeds that have been dried back to roughly the MC of dry seeds, i.e. having a MC in the range of from about 2% to about 15% of seeds (hereinafter dry seeds of the inventions).

Dry seeds of the invention are obtained by drying back seeds obtained according to any one processes, (a), (b), (c), a heat shock, a combination of either (a), (b) or (c) with a heat shock, according to the invention, to a final MC of the order of that of non-germinated, non-primed seed,(i.e. untreated seeds) using conventional i.e. fast drying conditions. Under conventional drying conditions, seeds can be dried back at a temperature lying within the range of from 10° C. to 50° C., generally from 20 C. to about 35° C., at a relative humidity within the range of from 30° C. to 90° C., generally from 30% to about 50%, in still air or in flowing air at speeds typical for drying back seeds. For example, the airflow speed may be at any speed up to 2 ms$^{-1}$ or faster. The period of time may be for any suitable time interval up to 24 hours, depending on drying conditions employed. Suitable conventional drying conditions include, for example, temperature of 20° C., a relative humidity of 40% in air flowing at a speed of 2 ms$^{-1}$ over 16 hours.

The dry seeds of the invention are useful, in that their germination rate is substantially shorter than that of untreated seeds of the same species. The germination rate is typically expressed in terms of $t_{50}$, i.e. the time by which 50% seeds of a seed sample germinate The wet seeds of the invention are useful, i.a. in that they can be dried back to dry seeds of the invention in conventional manner.

The—dry and wet—seeds of the invention have furthermore the advantage that they have a substantially longer shelf life than conventionally primed seeds of the same species having substantially the same MC.

The invention accordingly provides non-germinated seeds having a MC in the range of from 2 to 55% characterized in that said seeds when having a MC of untreated seeds, or after having been dried back to such a MC under conventional drying conditions, have a $t_{50}$ which is substantially shorter than that of untreated seeds of the same species. Suitably the $t_{50}$ is 60% or less than that of untreated seeds of the same species. Preferably the $t_{50}$ is 50% or less, more preferably less than 40%. The MC of untreated seeds is generally in the range of from 2 to 15%. The to, of the dr, seed of the invention is generally substantially the same as the $t_{50}$ of conventionally primed seed of the same species having substantially the same MC.

The $t_{50}$, may be determined in a conventional manner e.g. according to the method of Orchard T. G.( 1977) Seed Sci. & Technol. Vol 5. pp. 61–69. Generally such a determination is carried out at a temperature in the range of from about 15 to 20° C. on e.g water saturated filter paper.

The invention further provides treated primed seeds in wet or dry form having a shelf life when stored at ambient storage conditions which is substantially longer than that of conventionally primed seeds in either wet form or after having been subjected to conventional drying conditions.

The term shelf life as used herein refers to the time period (term) that seeds can be stored under ambient conditions without substantially losing their ability to germinate.

The ability of seeds of the invention to germinate is accordingly substantially unaffected after storage over a period of time and under conditions which adversely affect the germination ability (expressible in % normal plants germinating) of conventionally primed seeds.

For convenience, it is accepted that seeds have not substantially lost their ability to germinate after storage, if the % of germinating plants has not been reduced by more than 20% units, preferably less than 15% units, more preferably less than 10% units, after storage.

Thus, by the statement "seeds of the invention have a shelf life of at least 35% longer than conventionally primed seeds" is meant that it takes at least 35% storage time units longer for seeds of the invention to substantially lose their germination ability (% normal plant germinating) than conventionally primed seeds of the same species stored under the same conditions.

Dry seeds of the invention have a shelf life which is substantially longer than that of contventioally primed seeds of the same species of the same species having substantially the same MC. Suitably the shelf life is at least 35%, more specifically at least 50% longer than that of conventionally primed seeds of the same species when said conventionally primed seeds are dried back to a MC of untreated seeds under fast drying conditions as typically employed for the drying of conventionally primed seeds. Under optimum incubation/heat treatment conditions, the shelf life may be extended by 150% and more. Typically the shelf life will be extended by 50 to 120%, and even after incubation/heat treatment under less optimized conditions, by 50 to 100%. In absolute terms, the shelf life of dry seeds of the invention will easily exceed 8 months, more specifically 12 months, when stored under conditions typical for untreated seeds, and extend to 24 months or longer. The dry seeds of the invention have preferably a MC in the range of from 5% to 8%. The shelf life of the seeds of the invention, will not be longer than that of untreated seeds of the same species.

Suitable storage conditions for the dry seeds of the invention are ambient storage conditions, for untreated seeds e.g at a relative humidity generally of from about 20% to 90%, preferably from about 30% to 60% and a temperature of from about 3°C. to 25° C., depending on the seed type.

Appropriate shelf storage conditions for wet seeds of the invention may comprise storage in a container with minimal air and moisture exchange at a temperature of from about 3° C. to 10° C., depending on seed type. Under such storage conditions the seeds have a shelf life of from about 4 to 6 weeks.

The seeds of the invention may be any desired seed species to which a conventional priming process can be applied. Examples of suitable seed types include tomatoes, peppers, melons, water melons, cucumbers, Brassicas, leeks, carrots, onions, squashes, gherkins, endives, Impatiens, Verbenas, Primulas, Pelargoniums, Viola, Chigoriums and Cyclamen. Specific examples of Brassicas are cabbage, broccoli, cauliflower and Brussel sprouts.

Also encompassed within the ambit of the present invention are plants grown from seed as herein described.

There are a number of methods of priming seeds known in the art. These are briefly reviewed hereinafter:

Non-primed i.e. untreated seeds, depending on species, may be soaked up to a few hours in an aqueous solution in e.g. a water column, in a pre-priming treatment. Such a pretreatment known in the art, helps prevent the seeds from sticking together during priming, and/or readies the seeds for priming.

Non-primed seeds or seeds which have undergone the aforementioned pre-priming treatment, are placed under conditions e.g. time, temperature, water uptake by seed, which enable the seed to imbibe water to a level at which pre-germinative metabolic processes commence and continue but at which germination(as above defined) is not possible.

Imbibition may be carried out according to any known imbibition process. Thus for example (non-germinated) seeds to be imbibed may be placed in a drum or a water column, with or without aeration, at a water potential of 0 MPa (if the seeds are placed in water), or between about 0 MPa to about −1.5 MPa if the seeds are placed in an osmoticum solution. Depending on the choice of priming technique, the amount of water imbibed is defined by the osmotic potential of the priming solution (in aqueous liquid priming techniques such as water columns) and the amount of water added to the system (for eg drum priming techniques).

The seeds imbibe added water until their MC typically rises to between about 25% to about 55%, preferably to about 30% to about 50%, depending on seed type.

MC of seeds is calculated using the formula:

$$\frac{Wi - Wa}{Wi} \times 100$$

where

Wi=weight initial

Wa=weight after oven drying seeds at 103° C. for 16 hours or 130° C. over 2 hours.

Imbibition takes place at any temperature conducive to the up take of water, generally, between about 5° C. and about 30° C., depending on species. When imbibition takes place in a water column, the degree of aeration should be sufficient to keep the seeds buoyed or in suspension. Imbibition can be for any suitable period up to about 24 hours, preferably from about 4 to about 10 hours. depending on species. It may be a separate step before priming or may be an integral part of priming.

For proper priming the MC of the seeds is maintained at a relatively constant level, ie ±1 to 3% of the desired MC, typically i.e. between about 20% to about 55%, preferably between about 30% and 50%, of the seeds. Preferably, priming is carried out in a drum, for about 1 to about 21 days, preferably from about 2 days to 15 days, typically at a temperature in the range of about 5° C. to about 30° C., preferably from about 15° C. to about 25° C., depending on species. comprise any conventional material commonly used in seed coatings and may be added to the seed using conventional coating or pelleting techniques. The coating may comprise plant growth regulators such as gibberellins or auxins and/or any of the abovementioned microorganisms such as Pseudomonas or Trichoderma and the like. Typically, the content of growth regulator will be in the range of from about 0.0001% to about 0.1% by weight of the coating material.

The coating may comprise any conventional material commonly used in the art for protecting or pelleting seed. Suitable materials include clays such as sub-bentonite and bentonite, vermiculite, along with additives such as perlite, pumice, metal stearates, polyethene, polystryrene, polyurethane, talcum powder, polypropene, polyvinyl chloride, starches, loams, sugars, arabic gums. organic polymers, celluloses, flours such as wood flours, quartz powders and the like.

Accordingly the present invention further provides seeds obtainable by any one of the abovementioned processes, the seeds being colonised with beneficial biologicals.

In a yet further embodiment the present invention provides seed obtainable by any one of the abovementioned processes, the seed being provided with a protective coating which optionally has added biological.

There now follow examples which further illustrate the invention. It is to be understood that the examples are not to he viewed as limiting the scope of the invention in any way.

EXAMPLE 1 (SLOW DRYING)

60 g dry pretreated seeds of Viola are primed by being placed in a 6 litre drum which is (in its side at a speed of 3 rpm for 3 days in a room wherein the room temperature is controlled at 20° C. and the room RH is controlled at 70%. The drum has a 7.5 cm diameter opening in its lid, over which a cotton mesh is placed (mesh size approx. 0.1 mm), to allow for aeration of the seed. Seed MC during priming is maintained at 35% wet weight of the The optimum seed MC and length of the priming step, depends on the particular seed type employed. These optimum values can be found using conventional procedures, for example, by setting different MCs for seeds, subjecting seeds to different incubation periods under certain controlled conditions eg temperature, RH and aeration.

Where it is desired to add a biological to the seed, the biological may be applied using techniques known in the art. Thus for example the biological may be added in any suitable form e.g an inoculum which may/may not be in the form of a suspension of microorganisms in a suitable medium, dry fungal spores or freeze-dried or lyophilised bacteria. The biological may be added at any suitable stage of the process of the invention. Preferably it is added in the form of an inoculum at or near the beginning of the priming or alternatively in processes involving a treatment before priming, at or near the beginning of such pre-treatment.

Suitable biologicals may be selected from the group comprising beneficial microorganisms such as Bacillus. Pseudomonas, Trichoderma and Rhizobia. Particular examples of suitable micro-organisms include Pseudomonas fluorescence, *Pseudomonas putida, Xanthomonas maltophilia*, Bacillus spp. such as *Bacillus subtilis, Bacillus thuringiensis, Bacillus cereus, Trichoderma viride, Trichoderma harzarium, Trichoderma koningii, Gliocladium virens, Fusarium oxvsporum*(non-pathogenic isolates) and the like. The biological may be specifically chosen where it is desired to treat a seed such that it is resistant to a particular plant pathogen e.g Pseudomonas may be added to seed which is for sowing in soil known to be heavily infested by Pythium or Bacillus spp. may be added to seed to be sowed in seed which is prone to attack by Alternaria spp.eg carrot.

Generally the biological should be present in the range of from $10$ to $10^9$ colony forming units(cfu) seed$^{-1}$, depending on species of seed and biological Thus e.g the cfu of Rhizobia on legumes such as alfalfa, should be about $10^3$ seed$^{-1}$. However for most biologicals the cfu seed$^{-1}$, can be in the order of about $10^4$ to about $10^7$.

Where a seed coating is to be applied to the seed, it may be applied before, after or during the incubation period and either before or after any subsequent drying step. The coating may seeds. Initial MC of the dry seeds is determined by weighing a sample of the seed before and after oven drying for 2 hours at 130° C. Seed dry weight is determined using methods known in the art. A sufficient amount of water is added to the drum so as to bring the MC of the seeds up to the desired level, in this case 35% wet weight. Evaporation (1–2% per day calculated on a fresh weight basis) is monitored by weighing the drum and contents and replenishing with water to make up any weight differences observed between weighing, on a daily basis.

10 g (wet weight) control primed seeds are removed from the drum after 3 days and dried in flowing air (2 M/s) at a temperature of 20° C. and RH of 40% for 16 hrs. Drying rate is 5–10% moisture loss/hr calculated on a dry seed weight basis. Seed MC after drying is found to be 6%.

70 g of thus primed seeds of a test sample (MC 35%) a re subjected to incubation by being further incubated in the same drum for 3 days, in a room under the following slow drying conditions of temperature, relative humidity and rate of water loss: temperature 20° C., RH 90% and rate of water-loss is 0.1–0.3% MC/hr, determined by weighing as described above. The drum opening is covered with a nylon mesh having a pore size of approx. 0.6 mm to facilitate evaporation. Seeds are then taken out of the drum and dried under the same conditions as for control seeds above, to a MC of 6%.

Seeds are sown on water-saturated filter paper, and incubated at 20° C. in the light. The percentage of germinated seeds is counted daily, the mean time to germination $t_{50}$ is calculated according to the method of Orchard T. G.(1977) Seed Sci.& Technol. Vol 5, pp 61–69.

The percentage of normal plants is determined by sowing seeds in trays, on top of a 3 cm layer of standard potting soil supplied by EGO, The Netherlands (EGO 1 Peatsoil, pH 5.5, electrical conductivity 0.9 mS, total nitrogen content 5.1 mmol/1). The trays are covered with transparent covers and placed in the light (10,000 lux.) at a temperature of 20° C.

After 21 days seedlings are evaluated by cotyledon and hypocotyl visualization according to ISTA rules, as described in the Handbook for Seedling Evaluation supra, at page 64.

Shelf life is determined using CD tests as described in the reference cited above by Tarquis et al. 1991. For CD testing, the seed MC was uniformly increased to 10% by incubation in 75% RH for 3 days at 20° C. The samples of seeds in equilibrium at an RH of 75% were then sealed in jars that were incubated at 48° C. for 24 h. At the end of the deterioration period, the seeds are germinated on paper at 20° C. Normal seedlings are counted after 14 days. CD results are expressed as % germination of normal plants.

Seeds are stored at 18° C., and relative humidity 30% for 9, 14 and 23 months. After storage seeds are germinated on soil. Results are shown in Table 1.

TABLE 1

Data for different varieties of Viola:

| Variety | Cont. | Inv. | Cont. | Inv. | Cont. | Inv. |
|---|---|---|---|---|---|---|
| | $I_{50}$, directly after treatment | | CD-test results (24 hrs) | | Soil test, directly after treatment (% germination) | |
| "Roc Yellow" | 1.7 | 1.7 | 1 | 73 | 74 | 78 |
| "Roc Golden" | 2.0 | 1.8 | 7 | 68 | 65 | 69 |
| "Roc Blue" | 2.3 | 2.0 | 0 | 65 | 66 | 67 |
| "Roc White" | 1.5 | 1.3 | 0 | 52 | 88 | 84 |
| | Soil test after 9 months storage (% germination) | | Soil test after 14 months storage (% germination) | | Soil test after 23 months storage (% germination) | |
| "Roc Yellow" | 75 | 89 | 16 | 79 | 30 | 84 |
| "Roc Golden" | 76 | 83 | 36 | 86 | 26 | 75 |
| "Roc Blue" | 55 | 72 | 8 | 74 | 5 | 70 |
| "Roc White" | 61 | 89 | 3 | 85 | 2 | 79 |

Cont. = control primed seeds dried
Inv. = seed of invention

The results in the above table show the loss of viability during storage at 18° C. of conventionally primed seeds is much faster than that of seeds of the invention. Thus the viability of conventionally primed seeds drops between 9 and 14 months, whereas seeds of the invention remain viable for a period of longer than 23 months i.e for at least twice as long a period than conventionally primed seeds.

EXAMPLE 2 (SLOW DRYING)

60 g dry pre-treated seeds of Capsicum (pepper) are subjected to drum priming as in Example 1, except that during priming MC is maintained at 37% wet weight of the seeds. Thus a sufficient amount of water is added to bring the seed MC up to 37%.

10 g (wet weight) control seeds are removed from the drum after 3 days and dried as in the seeds control of Example 1 to a seed MC of 7%.

70 g thus primed seeds of a test sample (MC 37%) are subjected to incubation as in Example 1, in which the rate of moisture loss is 0.4% MC/hr. Seeds are then dried to a MC of 7%, under the same conditions as for control seeds of Example 1. Shelf life is determined by subjecting the seeds to a CD test as in Example 1 except that the seeds are incubated at 49° C. for 24 and 48 h. The results are shown in Table 2 below.

TABLE 2

Shelf life of conventionally primed pepper seeds compared with primed pepper seeds of the invention.

| | % normal plants after CD-test period (h) | | |
|---|---|---|---|
| | 0 | 24 | 48 |
| Standard Priming | | | |
| lot 1 | 86 | 63 | 4 |
| lot 2 | 96 | 70 | 2 |
| Slow Drying | | | |
| lot 1 | 84 | 82 | 57 |
| lot 2 | 94 | 92 | 72 |

The average $t_{50}$ before priming is 4.6 days, after both treatments i.e. standard priming and slow drying $t_{50}$ is 1.3 days.

EXAMPLE 3 (SLOW DRYING)

60 g dry seeds of Capsicum (pepper) are subjected to the steps described in Example 2. with a minor difference in the rate of moisture loss. There it is 0.3% MC/hr. Seeds are then taken out of the drum and dried to a MC of 7% under the same conditions as for control seeds.

Control seeds(conventionally primed seeds) and seeds of the invention are stored in air-tight aluminum-foil bags at 20 C. for 8 months.

Seeds are sown on water-saturated filter paper, and incubated at 20° C. in the light. The percentage of germinated seeds is counted daily, and the mean time to germination calculated as in Example 1.

Shelf life is determined employing a CD test as in Example 1, except that the seeds were incubated at 50° C.

% normal plants in soil s determined as described in Example 1.

The table shows that seeds of the invention survive both CD-conditions and normal storage conditions to a much larger extent than control seeds.

TABLE 3

Shelf life of conventionally primed pepper seeds compared with primed seeds of the invention. $t_{50}$ before priming is 3.0 days, after both treatments $t_{50}$ is 0.7 days.

| | % normal plants after CD test, period (hrs) | | % normal plants in soil test after storage period (months) | |
|---|---|---|---|---|
| | 0 | 24 | 0 | 8 |
| Standard priming | 99 | 4 | 81 | 15 |
| Slow drying | 98 | 94 | 84 | 88 |

EXAMPLE 4 (SLOW DRYING)

60 g dry seeds of Tomato are subjected to a drum priming as in Example 1, except that the length of priming is 7 days and seed MC during the incubation is maintained at 38% wet weight of the seeds. Thus, a sufficient amount of water is added to bring the seed MC up to 38%.

10 g (wet weight) control seeds are removed from the drum after 7 days and dried as for the control seeds of Example 1, to a MC of 6%.

70 g thus primed seeds of a test sample (MC 38%) are subjected to an incubation as in Example 1 in which the rate of water loss is 0.1–0.3% MC/hr. Seeds are then dried to a M.C. of 6%. under the same conditions as for control seeds of Example 1.

Seeds are sown on water-saturated filter paper, and incubated at 20° C. in the light. The percentage of germinated seeds is counted daily, the mean time to germination is calculated as in Example 1.

Shelf life is determined employing a CD test as in Example 1, except that the seeds were incubated at 50° C. for 24 h-, 48 h- and 72 h . Results are shown in Table 4.

TABLE 4

Shelf life of conventionally primed tomoato seeds compared with tomato seeds primed according to the invention.

| | % normal plants in paper test | | | |
|---|---|---|---|---|
| CD test | Standard priming | | Slow Drying | |
| period (hours) | lot 1 | lot 2 | lot 1 | lot 2 |
| 0 | 87 | 92 | 93 | 92 |
| 24 | 84 | 90 | 92 | 90 |
| 48 | 7 | 36 | 69 | 86 |
| 72 | 2 | 7 | 37 | 69 |

Average $t_{50}$ before priming is 4.0 days, after both treatments it is 1.5 days.

EXAMPLE 5 (SLOW DRYING)

1200 g dry seeds of Cauliglower cv. Serrano are subjected to a drum priming as in Example 1, except that during priming, the room temperature is controlled at 15° C. and seed MC is kept at 35%.

10 g (wet weight) control are removed from the drum after 7 days and dried as for the control seeds of Example 1, to a MC of 6%.

100 g seeds of a test sample (MC 35%), are subjected to incubation in a 6 liter drum for 5 days, in a wherein the room temperature is controlled at 20° C. and the room RH is controlled at 75%. The drum opening is covered with a nylon mesh having a pore size of approx. 0.6 mm to facilitate evaporation. Rate of water loss during the first day (0.62% MC/hr) is determined by weighing as described above. Seeds are then taken out of the and dried under the same conditions as for control seeds.

Shelf life is determined employing a CD test as in Example 1, except that the seeds were bated at 48° C. for 48 h.

Table 5 shows that a period of incubation that enables a slow reduction in seed MC strongly improves the shelf life of primed seeds, up to the shelf life of non-primed i.e. untreated seeds.

TABLE 5

| CD test | % normal plants in paper test (relative to control at start of CD test) | | |
|---|---|---|---|
| period (hours) | Control (not primed) | Standard priming | Slow Drying |
| 0 | 100 | 94 | 94 |
| 48 | 60 | 27 | 60 |

EXAMPLE 6 (SLOW DRYING)

1200 g dry seeds of carrot cv. Autumn king Trophy are subjected to a drum priming for 6 days, under the priming conditions as in Example 5, seed MC during priming being maintained at 38% wet weight of the seeds. Rate of moisture loss (1–2% per day calculated on a fresh weight basis) is monitored daily by weighing the drum and contents each day and replenishing with water each day to make up the weight differences observed between weighing.

10 g (wet weight) control seeds are removed from the drum after 7 days and dried as for control seeds of Example 1, to a MC of 6%.

100 g seeds of a test sample are subjected to incubation for 5 days under the same incubation conditions as Example 5. Rate of water loss during the first day (0.67%M.C $h^{-1}$) being determined as above described. Seeds are removed from the drum and dried as for control seeds.

Shelf life is determined employing a CD test as in Example 1, except that the seeds were incubated at 48° C. for 24 and 48 h.

Table 6 shows that a period of incubation which enables a slow reduction in seed MC, strongly improves the shelf life of primed carrot seeds.

TABLE 6

| CD test | % normal plants in paper test (relative to control at start of CD test) | | |
|---|---|---|---|
| period (hours) | Control (not primed) | Standard priming | Slow Drying |
| 0 | 100 | 94 | 94 |
| 24 | 85 | 71 | 97 |
| 48 | 71 | 13 | 64 |

EXAMPLE 7 (SLOW DRYING)

1200 g dry seeds of Chicory with of cv. Liberty are subjected to drum priming as in Example 1, except that seed MC is maintained at 38% wet weight of the seeds.

10 g (wet weight) control seeds are removed from the drum after 7 days and dried as for control seeds in Example 1, to 6% MC.

450 g seeds of a test sample are subjected to incubation in a 24 liter drum for 5 days, in a room wherein the room temperature is controlled at 20° C. and the room RH is controlled at 75%. The drum opening is covered with a cotton cloth having a pore size of approx. 0.1 mm to facilitate evaporation. Rate of water loss during the first day (0.29% MC/hr) is determined by weighing as described above. Seeds are then taken out of the drum and dried under the same conditions as for control seeds.

Shelf life is determined employing a CD test as in Example 1, except that the seeds were incubated at 50° C. for 24 h.

Table 7 shows that a period of incubation that enables a slow reduction in seed MC strongly improves the shelf life of primed witloof seeds, up to the level of non-primed seeds.

TABLE 7

| CD test | % normal plants in paper test (relative to control at start of CD test) | | |
|---|---|---|---|
| period (hours) | Control (not primed) | Standard priming | Slow Drying |
| 0 | 100 | 88 | 95 |
| 24 | 56 | 3 | 54 |

EXAMPLE 8 (SLOW DRYING)

1200 g dry seeds of Leek cv. Latina are primed for 4 days under the priming conditions of Example 5. 0.01 g/kg seed Aatopam is added to the seeds. Seed MC during the priming is maintained at 38% wet weight of the seeds.

10 g (wet weight) control seeds are removed from the drum after 7 days and dried as for the control seeds in Example 1, to 6% MC.

200 g seeds of a test sample are subjected to incubation in a 24 liter drum for 5 days, in a room wherein the room temperature is controlled at 20° C. and the room RH is controlled at 40%. The drum opening is covered with a nylon mesh having a pore size of approx. 0.6 mm to facilitate evaporation. Rate of water loss during the first day (1.04% MC/hr) is determined by weighing as described above. Seeds are then taken out of the drum and dried under the same conditions as for control seeds.

Shelf life is determined employing a CD test as in Example 1, except that the seeds were incubated at 48° C. for 24, 48 and 72 h.

Table 8 shows that a period of incubation that enables a slow reduction in seed MC strongly improves the shelf life of primed leek seeds, up to the level of non-primed seeds.

TABLE 8

| CD test | % normal plants in paper test (relative to control at start of CD test) | | |
|---|---|---|---|
| period (hours) | Control (not primed) | Standard priming | Slow Drying |
| 0 | 100 | 96 | 92 |
| 24 | — | 90 | 91 |
| 48 | — | 65 | 91 |
| 72 | — | 9 | 54 |

EXAMPLE 9 (MOIST STORAGE)

Pansy seeds are pretreated and primed as described in Example 1.

10 g control seeds are removed from the drum after 3 days and dried as for control of Example 1 to 6%.

10 g Seeds of a test sample (MC 34%) are dried as control seeds but to a MC of 25%.

The seeds are then transferred to a moisture-tight but not airtight plastic container and incubated at 20° C. for 3 days. After this incubation, the seeds are further dried similar to the control seeds.

Shelf life of the control (conventional priming), the seed of the invention(moist storage) and untreated seed(i.e. not primed), is determined as described in example 1.

Table 9 shows the survival of conventionally primed seeds and seeds of the invention, after the 24 hrs CD test, expressed as a relative value compared to untreated seeds.

The table shows that an incubation at a reduced but constant seed MC (as compared to the seed MC after priming) reinstates shelf life in primed seeds.

TABLE 9

CD-test data (relative to untreated seed) of Pansy seeds that have been conventionally drum-primed or treated according to the invention (moist storage).

| | CD test value (24 h) |
|---|---|
| Untreated | 100 |
| Control (conventionally primed) | 20 |
| Seeds of invention (moist storage) | 62 |

EXAMPLE 10 (MOIST STORAGE)

100 g dry seeds of Capsicum (pepper)cv. Abdera are drum-primed as in example 3.

The seed MC after priming was 35.3%. In 165 minutes the seeds were dried to a MC of 4.8% at a temperature of 25° C. 40% R.H, and an air speed of 2 ms$^{-1}$. Two replicate seed samples were taken at MCs of 35.3 (initial MC), 30.6%, 25.5%, 20.0%, 14.8%, and 9.6%.

These samples were incubated in a closed container (0.15 dl), one sample at 81° C., and the other at 20° C., for a period of 7 days.

After the incubations, all samples were dried to an end MC of 4.8%, under similar conditions as the first drying step.

Shelf life of the control (conventionally primed), the seed of the invention(moist storage) and untreated seed (i.e. not primed), is determined as described in example 1.

Table 10 shows that primed seeds dried back immediately after priming, to a MC of 4.8%, have a low survival after the CD test, while seeds incubated at a MC that is reduced with 5% to 15% as compared to the MC after priming, have a shelf life that is almost similar to unreated control seeds.

The temperature during this induction step is not critical to the process.

TABLE 10

Effect of incubation of primed seeds at different seed MC at a temperatune of 8° C. and 20° C. for a period of 7 days at 100% R.H. on CD-test survival.

| | CD-test results (24 h) % normal plants | |
|---|---|---|
| | Incubation at 8° C. | Incubation at 20° C. |
| Control (untreated) | 75 | 75 |
| Control (conventionally primed) | 12 | 4 |
| Incubation at 35.3% MC | 30 | 34 |
| Incubation at 30.6% MC | 64 | 60 |
| Incubation at 25.5% MC | 54 | 84 |
| Incubation at 20.0% MC | 22 | 52 |
| Incubation at 14.8% MC | 9 | 26 |
| Incubation at 9.6% MC | 14 | 4 |

EXAMPLE 11 (MOIST STORAGE)

Tomato seeds are primed as in Example 4, for 6 days seed MC being maintained at 37.1%.

10 g control seeds are removed from the drum after 6 days and dried as for control seeds of Example 1, to 6%.

10 g Seeds of a test sample (MC 37.1%) are dried as control seeds but to a MC of 25%.

The seeds are then transferred to a moisture-tight but not airtight plastic container and incubated at 20° C. for 3 days. After this incubation, the seeds are further dried as for the control seeds.

Germination rate and shelf life is determined as described in example 4. The control seeds had a t$_{50}$ of 4.4 days, the seeds treated according to the invention, had a t$_{50}$ of 1.5 days.

Table 11 shows the survival after employing a CD test as in Example 1, except that the seeds were incubated at 50° C. for 48 hrs, expressed as a relative value compared to untreated control seeds. The table shows that an incubation at a reduced, but constant seed MC i.e. moist storage (as compared to the seed MC after priming) reinstates shelf life in conventionally primed tomato seeds.

TABLE 11

CD-test data (relative to untreated seed) of tomato seeds that have been conventionally drum-primed or treated according to the invention (moist storage).

| | CD test value (48 h) |
|---|---|
| Control (Untreated) | 100 |
| Control (conventionally primed) | 6 |
| Seeds of invention (Moist storage) | 64 |

EXAMPLE 12 (HEAT STORAGE)

100 g dry seed.% of Capsicum (pepper)cv. Abdera are primed as in Example 3.

The seed MC after priming was 35.3%. In 165 minutes the seeds were dried to a MC of 4.89% at a temperature of 25° C., 40% R.H, and an air speed of 2 m.s$^{-1}$. Seed samples were taken at MCs of 35.3 (initial MC), 30.6%, 20.0%, 14.8%, and 9.6%. These samples were incubated in a sealed aluminum bag in a waterbath at a temperature of 40° C. for a period of three hours. After the incubations, all samples were dried to an end MC of 4.8% under similar conditions as the first drying step.

Shelf life of the control (conventional priming), the seed of the invention(moist storage) and untreated seed(i.e. not primed), is determined as described in example 1.

Table 12 shows that primed seeds dried back immediately after the treatment to a MC of 4.8% have a low survival after the CD test, while seeds that were given a heat shock survived the CD test much better. The heat shock was effective down to a seed MC of 15%.

TABLE 12

Effect of a heat shock on CD-test survival of primed pepper seeds.

| | CD-test results % normal plants |
|---|---|
| Control (untreated) | 75 |
| Control (conventionally primed) | 14 |
| Incubation at 35.3% MC | 62 |
| Incubation at 30.6% MC | 46 |
| Incubation at 20.0% MC | 44 |
| Incubation at 14.8% MC | 46 |
| Incubation at 9.6% MC | 24 |

EXAMPLE 13 (PEG TREATMENT)

10 gram Pepper cv. Abdera seeds are incubated on water-saturated filter paper in transparent plastic boxes at 25° C. in light.

Seed samples of 1 gram are removed every day until day 4. At day 4, 40% of the seeds had germinated, whilst at day 3, no germinated seeds were observed. Control seed samples were dried according to example 1. Test samples were transferred to filter paper saturated with a solution of polyethylene glycol with an osmotic potential of −1.5 MPa and incubated for 3 days at a temperature of 25° C. After the treatment, the seeds were washed and dried as for the control seeds.

Shelf life is determined employing a CD test as in Example 1.

Table 13 shows that seeds incubated in water for 1 day, have a somewhat enhanced shelflife. but incubation for 2 and 3 days show a progressive loss of shelf life, whereas in comparison, seeds of the invention (which have been incubated in PEG solution) demonstrate a prolonged shelf-life.

TABLE 13

| Length of incubation days | CD test result (24 h) control seeds | CD test result (24 h) seeds of invention |
|---|---|---|
| 0 | 84 | 82 |
| 1 | 92 | 97 |
| 2 | 71 | 91 |
| 3 | 7 | 57 |

EXAMPLE 14

Combination of Water Stress and Heat Stress 50 g dry seed of Viola (Roc Yellow) are primed as described in Example 1. After three days of priming seeds are transferred to aerated water at a temperature of 20° C. After 24 h in aerated water the majority of the seeds show splitting of the seed coat, but the radical has not yet broken through the enveloping endosperm. The seeds are then removed from the water and centrifuged. The seed MC is 48.5%.

5 g (wet weight) of these seeds, is dried by exposure at 20° C., to still air having a R.H. of 40%. After 24 h of drying the MC of the seeds is 6%. The remainder of the seeds is divided into three portions, each of which is exposed to air flowing at 2ms$^{-1}$ at a temperature of 20° C. and a RH of 40%. Seeds are exposed to the flowing air for several minutes until the three portions have reached MCs of 40, 35 and 30%. respectively. Two samples of 10 g are taken from each portion and packed in minimal moisture and air exchange plastic containers (180 ml) and thereafter incubated at temperatures of either 20° C. or 32° C. After 1 and 7 days incubation at the temperatures indicated, 2 g of each sample is dried under the same conditions as the seeds which were not incubated before drying, as above described.

Shelf life of the treated dried seed is determined using CD-tests similar to those described in Example 1, the seeds, being in equilibrium at a R.H. of 40% being incubated at 50° C. for 96 h and germinated on paper at 20° C. as described in Example 1.

Final germination percentage is counted after 14 days; the results below, show % germination in the absence of a CD-test control and after a CD-test (96 h).

TABLE 14

Germination percentage of primed viola seeds before and after CD tests after different incubation treatments.

| Incubation Treatment | | | Germination | CD-test |
|---|---|---|---|---|
| Time (day) | Temp. | Moisture | % (control) No CD-test | (96 h) Germination % |
| 0 | — | 48.5 | 87 | 34 |
| 1 | 20 | 40 | 86 | 49 |
| 1 | 20 | 35 | 86 | 69 |
| 1 | 20 | 30 | 82 | 75 |
| 1 | 32 | 40 | 81 | 68 |
| 1 | 32 | 35 | 84 | 87 |
| 1 | 32 | 30 | 82 | 69 |
| 7 | 20 | 40 | 85 | 64 |
| 7 | 20 | 35 | 88 | 76 |
| 7 | 20 | 30 | 82 | 78 |
| 7 | 32 | 40 | 82 | 92 |
| 7 | 32 | 35 | 89 | 79 |
| 7 | 32 | 30 | 89 | 83 |

We claim:
1. A process for prolonging the shelf life of primed non-germinated seeds comprising the steps of:
   a) incubating primed non-germinated seeds under conditions selected from the group consisting of
   (i) drying the primed seeds from about 1 to 7 days at a temperature range of about 3° to 40° C.;
   (ii) drying the primed seeds for not more than 24 hours to a moisture content of about 3 to 20% units lower than the moisture content of non-incubated primed seeds of the same species and maintaining the seeds in a container with minimal air and moisture exchange for about 1 to 7 days at a temperature range of about 3° to 40° C.;
   (iii) exposing the primed seeds to an osmoticum solution for about 1 to 7 days within the range of about −0.5 to about −4.0 MPa;
   (iv) exposing the primed seeds to a heat shock at a temperature in the range of about 25° to 45° C. for about 1 to 5 hours; and
   (v) a combination of substeps (i) or (ii) or (iii) and (iv) above; and
   b) obtaining incubated primed non-germinated seeds wherein the seed has a moisture content about 3 to 20% units lower than the moisture content of nonincubated primed non-germinated seeds of the same plant species and the incubated primed seeds have a prolonged shelf life without loss of viability as compared to the viability of nonincubated primed non-germinated seeds of the same plant species.

2. A process according to claim 1, wherein the incubation step is drying the primed seeds from about 1 to 7 days at a temperature range of about 3° to 40° C. and further comprises maintaining water loss of the seed during the incubation step within the range of 0.1 to 1.0% of dry weight of seed per hour.

3. The process according to claim 1 wherein the incubation step is drying the primed non-germinated seeds for not more than 24 hours to a moisture content of about 3 to 20% units lower than the moisture content of non-incubated primed seeds of the same species and maintaining the seeds a container with minimal air and moisture exchange at a temperature in the range from about 3° to 40° C. from about 1 to 7 days.

4. The process according to claim 1 wherein the incubation step is exposing the seeds to an osmoticum solution within the range of about −0.5 to about −4.0 MPa.

5. The process according to claim 1 further comprising the step of storing the incubated seeds at a temperature in the range of about 3° to 25° C. and at a relative humidity of about 20 to 90% wherein the storage conditions include minimal air movement and moisture exchange from between about 4 to 8 weeks.

6. The process according to claim 1 further comprising the step of drying back the incubated primed seeds at a temperature range of about 10° to 50° C. and a relative humidity of about 30 to 90% for not more than 24 hours.

7. The process according to claim 6 further comprising the step of storing the incubated dried seeds at a relative humidity of about 20 to 90%, and a temperature range from about 3° to 25° C. between 8 and 24 months.

8. The process according to claim 2 wherein the incubation step is exposing the incubated seeds at a temperature in the range from about 25° to 45° C. for about 1 to 5 hours.

9. The process according to claim 8 further comprising the step of drying back the incubated seeds at a temperature range from 10° to 50° C. and a relative humidity of about 30 to 90% for not more than 24 hours.

10. The process of claim 1 further comprising the step of applying a coating to the incubated seeds.

11. The incubated seeds produced according to claim 1 wherein the moisture content of the seed is between 15 and 55% on a fresh weight basis.

12. The incubated seed produced according to claim 6 wherein the moisture content of the seed is between 2 and 15% on a fresh weight basis.

13. The incubated seed produced according to claim 8 wherein the moisture content of the seed is between 15 and 55% on a fresh weight basis.

14. The incubated seed produced according to claim 9 wherein the moisture content of the seed is between 2 and 15% on a fresh weight basis.

15. A process for prolonging the shelf life of primed non-germinated seeds comprising the steps of:
   a) incubating primed non-germinated seeds by exposing the seeds to a heat shock from about 1 to 5 hours at a temperature range of 25° to 45° C.;
   b) obtaining incubated primed seeds wherein the seed has a moisture content about 3 to 20% units lower than the seed moisture content of nonincubated primed non-germinated seeds of the same plant species; and
   c) storing the incubated seeds at a temperature in the range of about 3° to 25° C. and at a relative humidity of 20 to 90% wherein the incubated seeds have a prolonged shelf life without loss of viability as compared to the viability of the nonincubated primed non-germinated seeds of the same plant species.

16. The incubated seeds produced according to claim 15 wherein the moisture content of the seeds is in the range of 15 to 55% on a fresh weight basis.

17. The process of claim 15 further comprising the step of drying back the incubated seeds at a temperature of about 10° to 50° C. and a relative humidity of about 30 to 90% for 24 hours or less and obtaining incubated primed seeds with a moisture content in the range of 2 to 15% on a fresh weight basis.

18. The incubated seeds produced according to claim 17.

19. The process according to claim 1 wherein the primed non-germinated seeds are selected from the group consisting of tomatoes, peppers, melons, watermelons, cucumbers, Brassicas, leeks, carrots, onions, squashes, gherkins, endives, Impatiens, Verbenas, Primulas, Pelargoniums, Violas, Cichoriums, and Cyclamen.

20. The process according to claim 6 wherein the primed non-germinated seeds are selected from the group consisting of tomatoes, peppers, melons, watermelons, cucumbers, Brassicas, leeks, carrots, onions, squashes, gherkins, endives, Impatiens, Verbenas, Primulas, Pelargoniums, Violas, Cichoriums, and Cyclamen.

21. A process for maintaining the viability of primed non-germinated seeds stored under ambient storage conditions for a prolonged period of time comprising the steps of:
   a) incubating primed non-germinated seeds under the conditions selected from the group consisting of
      (i) drying the primed seeds from about 1 to 7 days at a temperature range of about 3° to 40° C.;
      (ii) drying the primed seeds for not more than 24 hours to a moisture content of about 3 to 20% units lower than the moisture content of non-incubated primed seeds of the same species and maintaining the seeds a container with minimal air and moisture exchange for about 1 to 7 days at a temperature range of about 3° to 40° C.;
      (iii) exposing the primed seeds to an osmoticum solution for about 1 to 7 days within the range of about −0.5 to about −4.0 MPa;
      (iv) exposing the primed seeds to heat shock at a temperature in the range of about 25° to 45° C. for about 1 to 5 hours; and
      (v) a combination of substeps (i), (ii), (iii) and (iv) above;
   b) obtaining incubated primed non-germinated seeds wherein the seed has a moisture content of 3 to 20% units lower than the moisture content of nonincubated primed non-germinated seeds of the same plant species;
   c) drying back the incubated primed seeds at a temperature range of about 10° to 50° C. and a relative humidity of about 30 to 90% for 24 hours or less to obtain a seed moisture content of about 2 to 15%; and
   d) storing incubated dried seeds at a relative humidity of about 20 to 90%, and a temperature range from about 3° to 25° C. between 8 and 24 months.

* * * * *